United States Patent
Baud et al.

(10) Patent No.: US 12,337,462 B2
(45) Date of Patent: Jun. 24, 2025

(54) WIRELESS COMMUNICATION MICROPERCUSSION MARKING SYSTEM WITH CENTRALIZED MANAGEMENT, AND ASSOCIATED METHOD

(71) Applicant: TECHNOMARK INTERNATIONAL, La Talaudiere (FR)

(72) Inventors: Laurent Albert Paul Baud, Paris (FR); Stéphane Noel Jacob, Genilac (FR)

(73) Assignee: TECHNOMARK INTERNATIONAL, La Talaudiere (FR)

( * ) Notice: Subject to any disclaimer, the term of this patent is extended or adjusted under 35 U.S.C. 154(b) by 636 days.

(21) Appl. No.: 17/436,039

(22) PCT Filed: Mar. 5, 2020

(86) PCT No.: PCT/FR2020/050449
§ 371 (c)(1),
(2) Date: Sep. 2, 2021

(87) PCT Pub. No.: WO2020/178530
PCT Pub. Date: Sep. 10, 2020

(65) Prior Publication Data
US 2022/0168886 A1 Jun. 2, 2022

(30) Foreign Application Priority Data

Mar. 5, 2019 (FR) ..................................... 1902255

(51) Int. Cl.
*B25H 7/04* (2006.01)
*H04W 76/10* (2018.01)

(52) U.S. Cl.
CPC .............. *B25H 7/04* (2013.01); *H04W 76/10* (2018.02)

(58) Field of Classification Search
CPC ................................ B25H 7/04; H04W 76/10
(Continued)

(56) References Cited

U.S. PATENT DOCUMENTS

| | | | |
|---|---|---|---|
| 2010/0290396 A1* | 11/2010 | Karunakaran | H04L 45/04 370/328 |
| 2013/0107761 A1* | 5/2013 | Das | H04W 4/38 370/255 |
| 2018/0071907 A1* | 3/2018 | Myhill | B25F 5/00 |

FOREIGN PATENT DOCUMENTS

FR         3029443 A1    6/2016

OTHER PUBLICATIONS

Search report dated Aug. 17, 2020 issued in corresponding International Application No. PCT/FR2020/050449.

* cited by examiner

*Primary Examiner* — Hermon Asres
(74) *Attorney, Agent, or Firm* — Nath, Goldberg & Meyer; Joshua B. Goldberg (57) ABSTRACT

The invention concerns a marking system (1) comprising:
  a plurality of micro-percussion marking machines (2) each equipped with a respective wireless link device (3),
  a computer network infrastructure designed to generate a connection area where said respective link devices (3) cooperate with said infrastructure in order to establish a respective wireless connection (8) between each machine (2) and said network (7),
  a centralized marking management device (9) connected to the infrastructure (6) and intended to provide said machines (2) with first information and/or to receive second information from said machines (2).

The invention is particularly suitable for the micro-percussion marking of a large number of industrial components to ensure their identification and monitoring.

21 Claims, 4 Drawing Sheets

(58) Field of Classification Search
USPC .......................................................... 709/220
See application file for complete search history.

WIRELESS COMMUNICATION MICROPERCUSSION MARKING SYSTEM WITH CENTRALIZED MANAGEMENT, AND ASSOCIATED METHOD

This is a National Phase Application filed under 35 U.S.C. 371 as a national stage of PCT/FR2020/050449, filed Mar. 5, 2020, an application claiming the benefit of French Application No. 1902255, filed Mar. 5, 2019, the content of each of which is hereby incorporated by reference in its entirety.

TECHNICAL FIELD

The present invention concerns the general field of micro-percussion marking, and more precisely the production of micro-percussion marking in order to register one or more signs on a component, for example an industrial component.

More particularly, the invention concerns a marking system.

The invention also concerns an associated marking method.

PRIOR TECHNIQUE

Traditionally, micro-percussion marking has been carried out using marking systems comprising stationary marking machines near which parts to be marked are brought. These stationary machines are generally each connected to a respective stationary control means by which a user can enter respective marking data manually or call up a respective database containing respective marking data for the machine. It is also known to implement similar stationary machines but with a manual control unit mounted directly on the machine, the user being able to enter marking data to be carried out by the machine via the unit near the latter.

It is further known to implement marking systems comprising portable micro-percussion marking machines which are designed to be transported manually, by a user, to a part to be marked, and which are each provided with a respective power cable on the one hand to connect the portable machine to a respective energy source for supplying the latter and on the other hand to connect the machine to a respective fixed control unit for entering respective marking data.

It is also known to implement a marking system with an on-board control unit on a portable marking machine provided with a battery power supply, in order to enter marking data manually via the on-board unit and to dispense with the computer and the power cable.

These systems dedicated to micro-percussion marking, although generally satisfactory in their use, nonetheless have certain drawbacks.

Thus, these known micro-percussion marking systems have significant limitations in terms of interfacing not only between the means or control units on the one hand and their associated machines on the other hand, but also between the various machines in operation themselves. For example, it is particularly difficult to implement several known marking machines which must operate at the same time to mark different parts with distinct signs both without risk of error, in particular an unwanted repetition of serial numbers, and with a satisfactory yield, that is to say at a high marking speed.

Known marking systems also have a low level of interoperability, and it is necessary to configure each machine according to its own control system, which requires the use of many skilled specialist operators and multiplies the risk of error.

Thus, even if marking systems are known and can be produced as such, the aforementioned drawbacks demonstrate that they are not suitable for a simple, efficient and flexible implementation of different marking operations at the industrial scale.

Ultimately, the known micro-percussion marking systems are particularly expensive, complex and time-consuming to adjust between each marking, and further present a high risk of marking error. They also ask to mobilize a large skilled workforce. Finally, the known micro-percussion marking systems are difficult to use in combination with one another.

DISCLOSURE OF THE INVENTION

The objects assigned to the present invention therefore aim to remedy the various drawbacks listed above and to propose a new marking system which, while being particularly efficient, is particularly simple to implement, inexpensive and flexible at will.

Another object of the invention aims at providing a new marking system whose operation is particularly easy to adapt to a plurality of marking machines of the same type or of different types.

Another object of the invention is to provide a new marking system capable of effectively micro-percussion marking a large quantity of components with an extremely low risk of marking error, even in a short period of time.

Another object of the invention aims at providing a new marking system which is both reliable and economically competitive.

Another object of the invention aims at providing a new marking system particularly suited to high marking rates.

Another object of the invention aims at providing a new marking system, whose design gives it particularly flexible operation and easy to change according to the needs of the users.

Another object of the invention aims at providing a new marking system with optimized performance, thus allowing using the most accurate sizing of the elements contributing to the marking.

Another object of the invention aims at providing a new marking system requiring little maintenance and reduced labor or at least reduced skilled labor.

Another object of the invention aims at providing a new marking system that is particularly effective and suitable for the marking of industrial components.

Another object of the invention aims at providing a new marking system making it possible to optimize the management of marking data, and in particular the implementation of marking instructions, their implementation and their monitoring.

Another object of the invention aims at providing a new marking system that is particularly easy to install in a structure or industrial installation under construction or already in existence.

Another object of the invention aims at providing a new marking method that is easy to implement, and which makes it possible to obtain an improvement in the marking speed while ensuring a significant reduction in the risk of marking error.

The objects assigned to the invention are achieved using a marking system characterized in that it comprises:
 a plurality of micro-percussion marking machines each equipped with a respective wireless link device, a computer network infrastructure designed to generate a wireless connection area, in which each wireless link device can be positioned to cooperate with said infrastructure so as to establish a respective wireless connection between each of said marking machines and said network, a centralized marking management device connected to said network infrastructure and intended, via said network and said wireless connections, to supply said marking machines with first information and/or to receive second information from said marking machines.

The objects assigned to the invention are also achieved using a marking method comprising:

a step of generating a wireless connection area, a positioning step in said wireless connection area of a plurality of micro-percussion marking machines each equipped with a respective wireless link device, a connection step in which each wireless link device establishes a respective wireless connection between each of said marking machines and a computer network, a transmission step, in which a centralized marking management device, via said network and said wireless connections, provides said marking machines with first information and/or receives second information from said marking machines.

SUMMARY DESCRIPTION OF THE DRAWINGS

Other features and advantages of the invention will appear and emerge in greater detail on reading the description given below, with reference to the accompanying drawings, given solely by way of illustrative and non-limiting examples, in which.

BEST WAY TO MAKE THE INVENTION

As illustrated in the figures, the invention concerns, according to a first aspect illustrated in the figures, a marking system 1. Of course, the marking system 1 is preferably intended to mark by micro-percussion at least one part to be marked, for example a component or industrial product, so as to deform it to register at least one sign which is itself advantageously intended to provide an identification to distinguish said marked part from other also marked parts (preferably also thanks to the same system 1), or group several parts together having the same sign(s). The marking system 1 is thus preferably designed to plastically deform by micro-percussion any type of suitable part to be marked, for example a component made of metal, polymer, wood, or any other suitable material.

According to the invention, the marking system 1 comprises a plurality of micro-percussion marking machines 2 each equipped with a respective wireless link device 3. Thus, each marking machine 2 advantageously embeds at least one respective wireless link device 3, which is for example of the radio type and in particular of the Wi-Fi™ type or else the Bluetooth™ type or any other appropriate standard (in particular according to one or more of the mobile telephony standards such as 2G, 3G, 4G, 5G, etc.). Preferably, the wireless link device 3 is therefore designed to provide a wireless link, preferably radio, between the marking machine 1 that it equips and another element (which will be detailed below). The wireless link device 3 can in particular be formed by a respective transmitter or receiver. The wireless link device 3 can in particular be removable, that is to say be detached from said marking machine 2, and it is preferably integrated within said marking machine 2 or attached thereto, or still partially integrated within the latter. Optionally, the wireless link device 3 can also equip a respective accessory of said marking machine 2 which is intended to be attached to the latter, and therefore to be an integral part thereof, at least for the desired operation of said marking machine 2, said accessory being for example removable. In the figures, the wireless link devices 3 are integrated within their respective marking machines 2, and are not visible from the outside, but they could just as easily be flush with or protrude from said marking machines 2 while being visible.

Each marking machine 2 advantageously comprises a respective marking head 4 provided with a respective movable punch 5, which is intended to strike a respective part to be marked so as to deform the latter in order to register at least one respective sign therein, and possibly a plurality of consecutive signs, the sign or signs forming, for example, one or more serial numbers, inscriptions, brands, logos, alphanumeric characters, ornamental patterns, identification symbols, two-dimensional matrix markings-coding, in particular of the Data Matrix® type, etc.

The invention concerns, according to a second aspect, a marking method, which is preferably implemented using the marking system 1 mentioned above, and described in more detail below. Thus, preferably, the following description concerning the marking system 1 therefore also applies to the marking method of the invention, and vice versa.

The marking system 1 according to the invention further comprises a computer network 7 infrastructure 6 designed to generate a wireless connection area, in which said marking machines 2 can be positioned so that their respective wireless link devices 3 cooperate with said infrastructure 6 so as to establish a respective wireless connection 8 between each of said marking machines 2 and said network 7. Thus, said infrastructure 6 advantageously allows the creation of a computer network 7, for example of the intranet or internet type, said computer network 7 connecting several elements of said infrastructure 6 to one another via wired or wireless digital communication means. Said computer network 7 is schematically represented in the figures by a globe, while the infrastructure 6 advantageously comprises at least one solid element of the «hardware» or computer hardware type, for example a server. Each wireless link device 3 therefore makes it possible to connect said marking machine 2, and more particularly said marking head 4, to said computer network 7, via said wireless connection 8, when said marking machine 2 is positioned in said connection area.

Preferably, said network infrastructure 6 comprises at least one wireless connection terminal (not illustrated) intended to connect with at least one of said wireless link device 3 to establish said wireless connection 8, at least one part of said area located around said terminal. Said wireless connection terminal advantageously allows the connection of said link device 3 to said network 7, and preferably constitutes a «hotspot» or connection point to said network 7. Said wireless connection terminal advantageously forms a radio connection point to said network 7, for example via Wi-Fi™ or other suitable standard.

Advantageously, said wireless connection 8 is a radio connection, for example of the Wi-Fi™ type or possibly of the Bluetooth™ type, said wireless connection device 3 therefore being designed to be connected via radio link, for example Wi-Fi™ or other appropriate standard, to said network 7.

Said infrastructure 6 may optionally comprise a plurality of terminals similar to that mentioned above and for the same use, said terminals making it possible to generate together said connection zone, which can therefore be relatively localized or, on the contrary, very extensive.

The marking method comprises according to the invention a step of generating a wireless connection area, preferably using a computer network 7 infrastructure 6 such as mentioned above and described in more detail below.

Also according to the invention, the marking method further comprises, preferably after said generation step, a step of positioning in said wireless connection area a plurality of micro-percussion marking machines 2 (preferably as mentioned above) each equipped with a respective wireless link device 3 (preferably as mentioned above).

Still according to the invention, the marking method comprises, preferably after said positioning step, a connection step in which each wireless link device 3 establishes a wireless connection 8 (preferably as mentioned above) respectively between each of said marking machines 2 and a computer network 7 (preferably as mentioned above). Preferably, said connection step comprises a cooperation step in which each wireless link device 3 cooperates with said infrastructure 6 to establish said respective wireless connections 8 between each of said marking machine 2 and said network 7.

Preferably, the marking method comprises, before said connection step, an equipment step in which said micro-percussion marking machines 2 are each equipped with said respective wireless link device 3.

The marking system 1 according to the invention also comprises a centralized marking management device 9 connected to said network 7 infrastructure 6 and intended, via said network 7 and said wireless connections 8, to provide said marking machines 2 with the first information and/or to receive second information from said marking machines 2. Said management device 9 is therefore advantageously designed to be connected to several of said marking machines 2, and more particularly to the respective marking head 5 of each machine 2, to give and/or receive from said plurality of machines 2 specific information to each machine 2, in this case said first and/or second information, and process them centrally. It is therefore possible, thanks to the marking system 1 of the invention, to manage several marking machines 2 of the same type or of different types with high interoperability, thanks to the centralized management of said first and/or second information, and a minimal risk of marking error (such as an unwanted duplicate, a wrong number, and/or incorrect handling by an operator).

According to the invention, the marking method comprises a transmission step, in which a centralized marking management device 9 (which is preferably as mentioned above and connected to said network 7 infrastructure 6), via said network 7 and said wireless connections 8, provides said marking machines 2 with first information and/or receives from said marking machines 2 second information.

Advantageously, as illustrated in the figures, said network 7 infrastructure 6 comprises at least one company server 10 through which pass and/or are processed said first information and/or said second information.

Obviously, said business server 10 is advantageously connected to said connection terminal or terminals, by wired or wireless link, to:
- transmit said first information to said terminal or terminals which themselves will transmit them to said marking machines 2, and/or
- receive, via said terminal or terminals, said second information from said marking machines 2.

Thus, advantageously, said business server 10 is connected to said terminal and serves as an intermediary between the latter and said centralized marking management device 9.

Preferably, said first information comprises separate marking instructions for each of said marking machines 2. More particularly, the centralized marking management device 9 is advantageously designed to transmit to said marking machines 2, via said network 7 and said wireless connections 8, said first information in a specific manner (that is to say distinct information relating to each of said other marking machines 2). Advantageously, the centralized marking management device 9 is designed to manage the different marking machines 2 in interdependence from one another, that is to say in particular that the first and/or second information transmitted and/or received by said centralized marking management device 9 vis-à-vis one of said marking machines 2 depend on the first and/or second information sent and/or received by said centralized marking management device 9 vis-à-vis of another of said marking machines 2. Such a configuration allows in particular the system 1 (and associated marking method) to mark by micro-percussion without error multiple industrial components in a very short time interval using said plurality of marking machines 2. This configuration is moreover particularly suitable for the marking by micro-percussion of objects, for example for the writing of serial number generated automatically, pre-recorded serial numbers, or even batch numbers (for example, each batch having a certain number of identical numbers within a limit which must not be exceeded). The centralized marking management device 9 therefore preferably manages the marking machines 2 in interdependence, but it can only be a centralized relay through which pass said first and/or second information which is in practice advantageously processed via said network 7, for example by the user interface 11, the production management program 14, and/or the dedicated server 15 which will be detailed below.

Thus, preferably, all the marking machines 2 placed in said connection zone 8 and connected to said network 7 can receive from said management device 9 or send to the latter information specific to each machine 2, said specific information being formed:
- by said first information when sent by said centralized management device 9 and received by said marking machines 2, and
- by said second information when they are sent by said marking machines 2 and received by said centralized management device 9.

For example, said respective sign comes from said first information, which therefore comprise at least marking data, which includes for example a set of serial numbers to be micro-percussion marked on different parts to be marked.

According to another example, compatible with the preceding one, said first information comprises configuration data of said marking machines 2, including for example a font size, data concerning the material to be marked, an instruction concerning the punching force that the punch mobile 5 must exercise, etc.

According to yet another example, compatible with the previous ones, said second information is separate status reports of each of said marking machines. One or more of said status reports may in particular comprise:

a number of respective marking cycles performed by one or more of said marking machines 2, and/or a respective operating temperature of one or more of said marking machines 2.

According to yet another example, compatible with the preceding ones, said state reports comprise state data of said marking machines 2, said state data possibly being generated for statistical purposes or directly in the form of statistics, said data report may also include any type of functional information relating to said marking machines 2.

According to yet another example, compatible with the previous ones, one or more of said marking machines 2 is/are portable, as illustrated in the figures. According to another example, possibly at least in part compatible with the previous ones, one or more of said marking machines 2 is/are fixed, as illustrated in the figures. Thus, the marking system 1 of the invention is advantageously flexible enough to operate both with stationary marking machines 2 as with portable marking machines 2, or a combination of the two, these marking machines possibly being of any type of as long as they are each equipped with a wireless link device 3 and are located in said connection zone.

According to yet another example, compatible with the previous ones, one or more of said portable marking machine(s) 2 is/are each provided with a respective battery ensuring its/their autonomy. For example, one or more of said status reports comprises data relating to the charge level of each battery. Alternatively, said portable marking machine(s) 2 is/are each provided with a respective power cable.

Each status report can also comprise other types of information, for example an evaluation of the spatial position of each marking machine 2, the distance between said marking machine 2 and said wireless connection terminal, possible mechanical problems, etc.

Preferably, said centralized marking management device 9 comprises a user interface 11, for example a screen possibly connected to a computer, the latter possibly forming part of the centralized marking management device 9 and/or of said company server 10 and/or said infrastructure 6. Said infrastructure 6 and said centralized marking management device 9 can therefore optionally include common elements.

Advantageously, said centralized marking management device 9 comprises a management program 12 of said first and/or second information.

Figure 1:
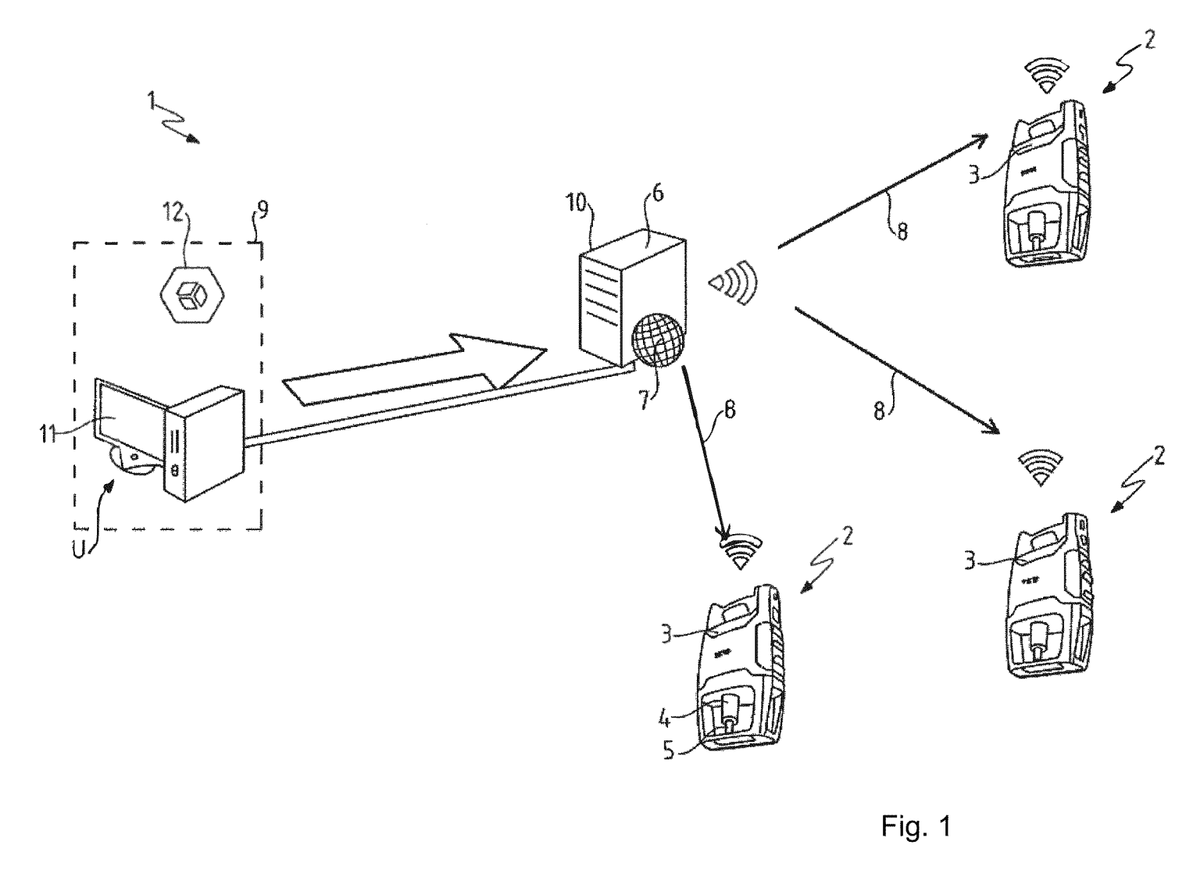
FIG. 1 is a simplified schematic illustration of a marking system according to a first embodiment of the invention.

According to a first embodiment, as illustrated in FIG. 1, said user interface 11 is designed to allow a user U to manually enter said first information and/or read said second information, for example using said management program 12 which makes it possible in particular to display, for example on said screen, said second information, or to manually enter said first information (in particular using a keyboard, a touch screen, etc. forming part of the user interface 11). Of course, said user interface 11 advantageously makes it possible to display said first information and/or said second information. In this latter embodiment, the management program 12 is advantageously designed at least to allow the creation of markings manually by the user.

Figure 2:
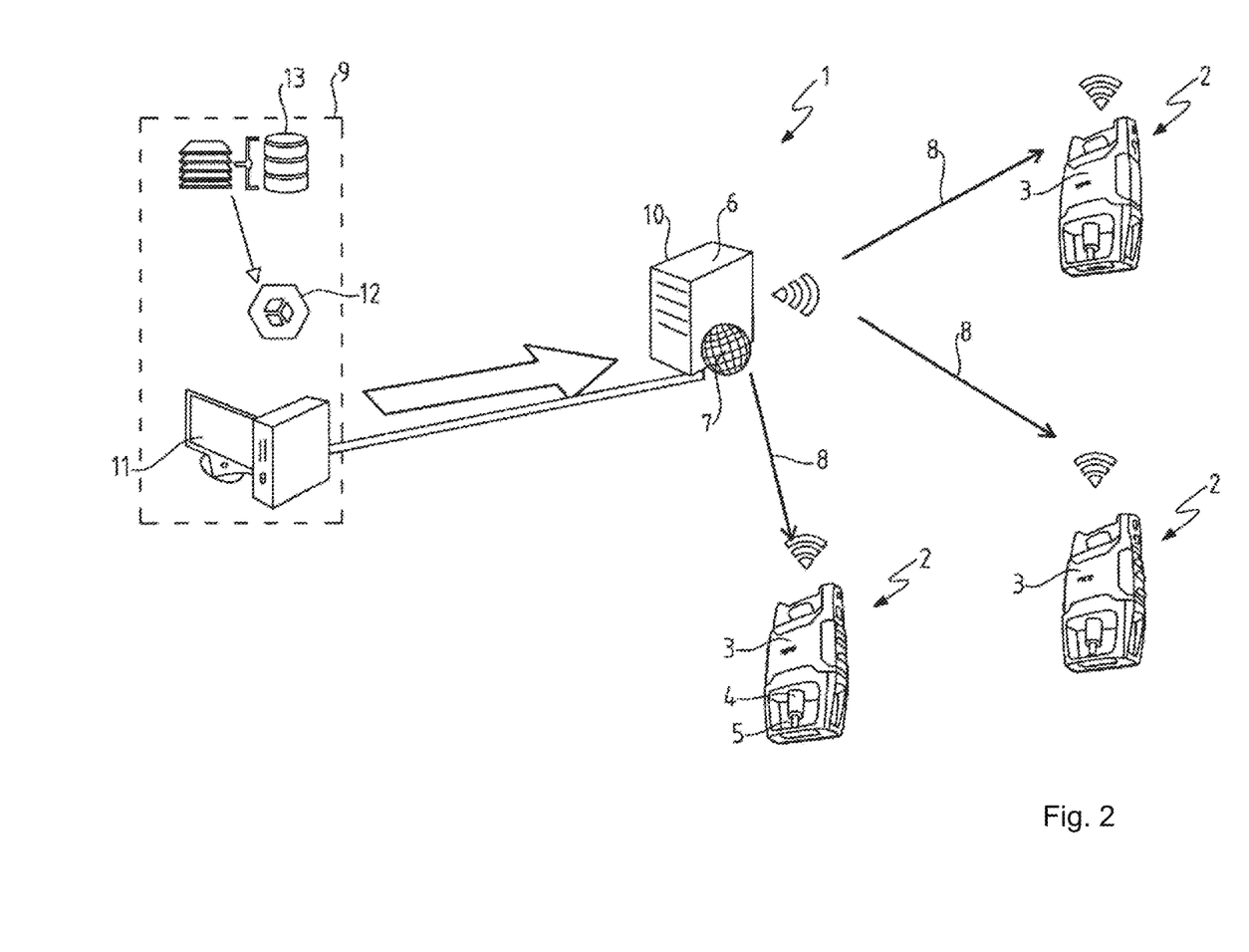
FIG. 2 is a simplified schematic illustration of a marking system according to a second embodiment of the invention.
Figure 3:
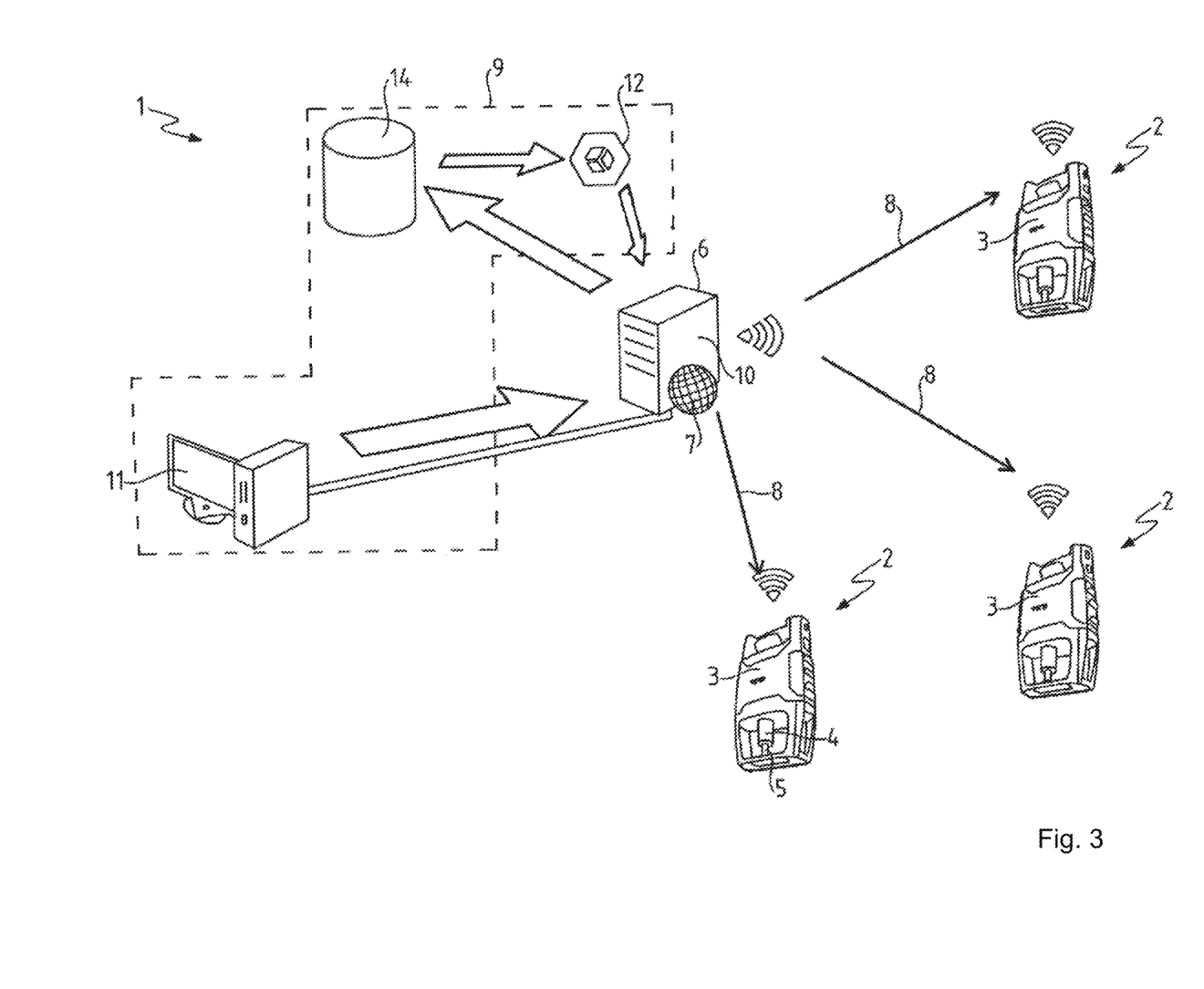
FIG. 3 is a simplified schematic illustration of a marking system according to a third embodiment of the invention.

According to a second embodiment, illustrated in FIGS. 2 and 3 and compatible with the first embodiment, said centralized marking management device 9 further comprises at least one database 13 comprising at least part of said first information and/or recording at least in part said second information. This embodiment is particularly advantageous when a user U wishes to involve said database 13, which comprises for example one or more text or Excel® type files, and in which said first information is entered beforehand and/or is recorded as said second information. In particular, said database 13 is advantageously managed automatically by said management program 12, so that said centralized marking management device 9 sends said first information from said database 13 or records said second information in said database 13, automatically, that is to say preferably without the user intervention U other than a main order of use of said database 13. Alternatively, or in combination with the above, said database 13 is managed manually by the user U via said management program 12, the user U for example entering data himself in said database (for example said first and/or second information), or extracting data itself (for example said first and/or second information) from said database 13.

According to a third embodiment, compatible with the other embodiments described above, said centralized marking management device 9 further comprises production management program 14 intended to automatically supply said first information. Advantageously, said production management program 14 is capable of carrying out all or part of said database 13.

Advantageously, in this third embodiment, said production management program 14 is intended to automatically produce, optionally on a simple order from a user U, said first information and/or said database 13 comprising the latter, said first information including in particular said marking data and/or said configuration data, said management program 12 being intended to translate said first information (and more particularly said data) as machine instructions and then to transmit them to said marking machines 2 via said network 7 and said wireless connections 8.

Figure 4:
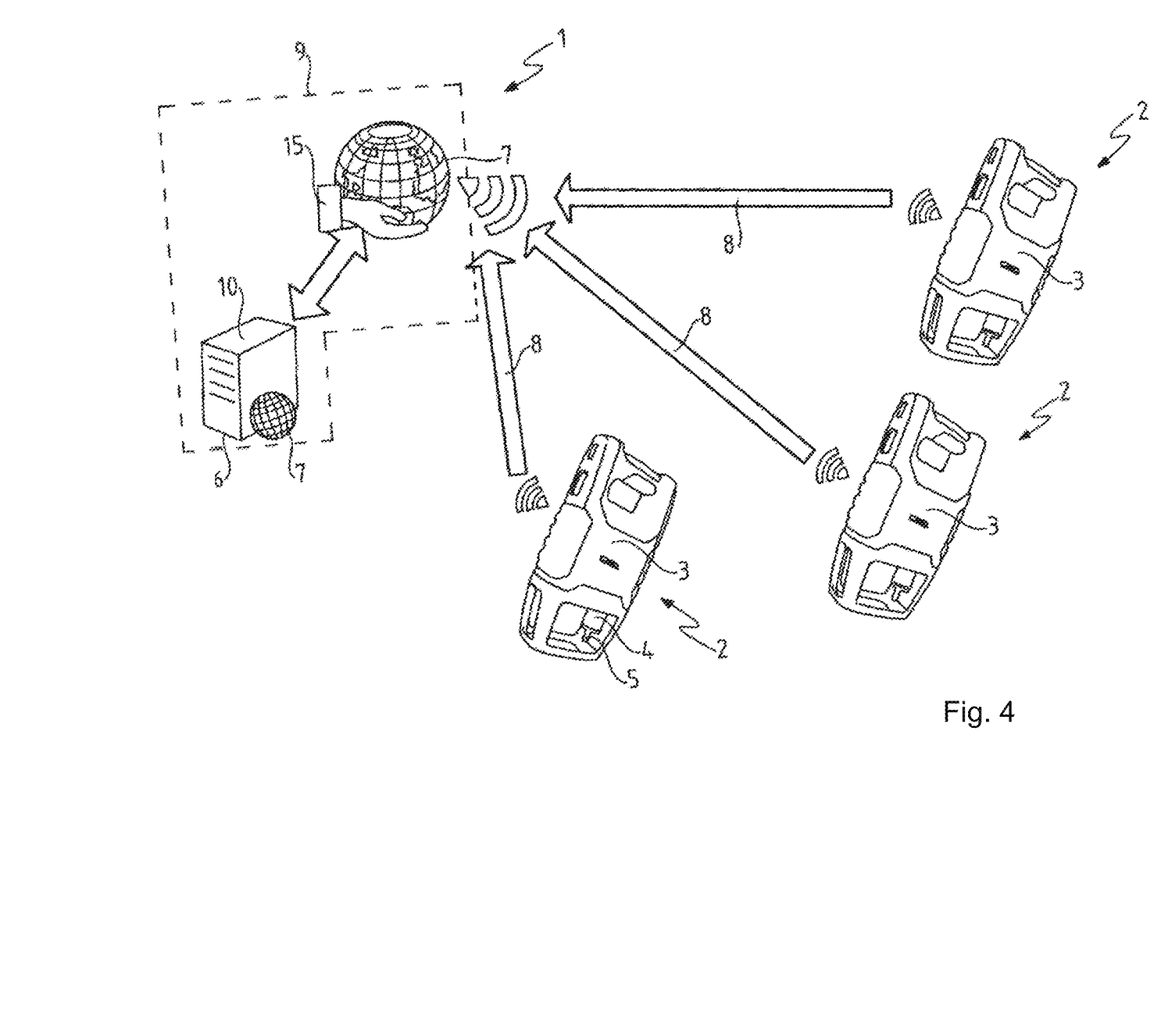
FIG. 4 is a simplified schematic illustration of a marking system according to a fourth embodiment of the invention.

According to a fourth embodiment, compatible with the previous embodiments, said marking system 1 comprises a dedicated server 15, said business server 10 being designed to go through said dedicated server 15 in order to process and/or transmit said first information and/or said second information. In particular, said business server 10 and/or said dedicated server 15 is/are designed to use the MQTT protocol in order to process and/or transmit said first information and/or said second information. For example, the business server 10 goes through said dedicated server 15, optionally using a protocol of the MQTT type, to transmit said first and/or second information to a remote element of said infrastructure 6, a third-party source, a third-party server, etc. or simply to filter said first and/or second information, said information being for example intended for a customer. The dedicated server 15 advantageously has the function of making available, preferably to a selected audience, said first and/or second information passing through said business server 10. The business server 10 is therefore advantageously designed to use a protocol of the MQTT type or any other type of appropriate protocol or to go through a dedicated server 15 using an MQTT type protocol or any other type of appropriate protocol, in order to process and/or transmit said first information and/or said second information. The dedicated server 15 in the configuration mentioned above can in particular serve as an intermediary between the company server 10 and an external third party having access rights to the first and/or second information passing through said company server 10, or even allow filtering or display of said first and/or second information or any other possible use of this information. Such a configuration, as illustrated in FIG. 4, is particularly advantageous in the context of the Internet of things, each marking machine 2 being for example designed to be connected via said respective wireless connection 8 to the business server 10 or dedicated 15 using for example the MQTT protocol to provide said server 10, 15 with said second information, for example a specific status report for each of said marking machines 2, allowing a user U and/or a program (for example said production management program 14) to know in real time the operating state of each marking machine 2, for example its temperature, its battery level if applicable, its marking speed, possible mechanical problems, even its position, etc. The business 10 or dedicated 15 server using for example the MQTT protocol (or any other appropriate protocol) thus advantageously makes it possible to produce a monitoring sheet (formed in particular by said second information) of each marking machine 2 connected to said network 7. In this fourth embodiment, or even in the previous ones, it is quite possible, as illustrated in FIG. 4, for said centralized marking management device 9 to be integrated within the company server 10 and/or of the dedicated server 15, and that said computer network 7 is formed in whole or in part by the Internet network or a corporate intranet network.

According to a not illustrated embodiment, said marking system 1 comprises a first respective RFID means fitted to each marking machine 2, and a respective second RFID means fitted to a respective separate device of said marking machine 2 (said separate device possibly being able to be removable relative to said machine 2), said respective wireless connection 8 being configured by means of RFID recognition between said first and second RFID means, that is to say a pairing between said first and second RFID means, or else a reading of one of said first and second RFID means by the other.

Preferably, the term Wi-Fi™ designates here wireless communication protocols governed by the standards of the IEEE 802.11 group (IEEE designating in particular the Institute of Electrical and Electronics Engineers).

POSSIBILITY OF INDUSTRIAL APPLICATION

The system 1 and the marking method of the invention are particularly suitable for carrying out, using several separate marking machines, the micro-percussion marking of a large number of industrial components, to ensure their identification and/or their monitoring, while minimizing the risk of error, unwanted duplicates, and/or operator mishandling.

The invention claimed is:

1. A marking system (1), comprising:
    a plurality of micro-percussion marking machines (2) each equipped with a respective wireless link device (3);
    a computer network (7) infrastructure (6) for generating a wireless connection area, in which said plurality of micro-percussion marking machines (2) are positioned so that their respective wireless link devices (3) communicate with said computer network (7) infrastructure (6) to establish a respective wireless connection (8) between each of said micro-percussion marking machines (2) and said computer network (7), such that each of the micro-percussion marking machines (2) positioned within the wireless connection area is wirelessly connected to the computer network (7) infrastructure (6) through the respective wireless connection (8); and
    a centralized marking management device (9) connected to said computer network (7) infrastructure (6), said centralized marking management device (9) wirelessly transmitting to said plurality of micro-percussion marking machines (2) first information and/or wirelessly receiving second information from said plurality of micro-percussion marking machines (2) through the computer network (7) and the wireless connections (8)
    wherein the first information comprises individual marking instructions and/or configuration data for each of said micro-percussion marking machines (2), and
    wherein the second information comprises individual status reports from each of the micro-percussion marking machines (2).

2. The marking system (1) according to claim 1, characterized in that said computer network (7) infrastructure (6) comprises at least one wireless connection terminal connected with at least one of said wireless link devices (3) to establish said wireless connection (8), at least part of said wireless connection area being around said at least one wireless terminal.

3. The marking system (1) according to claim 2, characterized in that said computer network (7) infrastructure (6) comprises at least one business server (10) through which pass and/or are processed said first information and/or said second information.

4. The marking system (1) according to claim 3, further comprising a dedicated server (15), said at least one business server (10) passing through said dedicated server (15) in order to process and/or transmit said first information and/or said second information.

5. The marking system (1) according to claim 4, characterized in that said at least one business server (10) and/or said dedicated server (15) use the MQTT protocol in order to process and/or transmit said first information and/or said second information.

6. The marking system (1) according to claim 1, characterized in that said centralized marking management device (9) further comprises at least one database (13) comprising at least part of said first information and/or at least partially recording said second information.

7. The marking system (1) according to claim 3, characterized in that said at least one business server (10) is connected to said wireless connection terminal and serves as an intermediary between the wireless connection terminal and said centralized marking management device (9).

8. The marking system (1) according to claim 1, characterized in that each said wireless connection (8) is a radio connection.

9. The marking system (1) according to claim 1, characterized in that one or more of said status reports comprises:
    a number of respective marking cycles performed by one or more of said micro-percussion marking machines (2), and/or
    a respective operating temperature of one or more of said micro-percussion marking machines (2).

10. The marking system (1) according to claim 1, characterized in that one or more of said micro-percussion marking machines (2) is/are portable(s).

11. The marking system (1) according to claim 10, characterized in that one or more of said micro-percussion marking machine(s) (2) is/are each provided with a respective battery ensuring its/their autonomy.

12. The marking system (1) according to claim 11, characterized in that one or more of said status reports comprises data relating to a charge level of each of the batteries.

13. The marking system (1) according to claim 1, characterized in that said centralized marking management device (9) comprises a user interface (11).

14. The marking system (1) according to claim 12, characterized in that said user interface (11) is designed to allow a user (U) to manually enter said first information and/or read said second information.

15. The marking system (1) according to claim 1, characterized in that said centralized marking management device (9) comprises a production management program (14) for automatically providing said first information.

16. The marking system (1) according to claim 1, characterized in that each of the micro-percussion marking machines (2) comprises a respective marking head (4) provided with a respective movable punch (5), each of the movable punches (5) being configured to impact a respective part to be marked so as to deform the part in order to register at least one respective sign therein.

17. The marking system (1) according to claim 16, characterized in that said respective sign comes from said first information.

18. A marking method comprising:
   generating a wireless connection area;
   positioning a plurality of micro-percussion marking machines (2), each equipped with a respective wireless link device (3), in said wireless connection area;
   establishing a respective wireless connection (8) between each of said micro-percussion marking machines (2) and a computer network (7) using the respective wireless link devices (3), such that each of the micro-percussion marking machines (2) positioned within the wireless connection area is wirelessly connected to the computer network (7) through the respective wireless connection (8); and
   a centralized marking management device (9), through said computer network (7) and said wireless connections (8), wirelessly transmitting to said micro-percussion marking machines (2) first information and wirelessly receiving second information from said micro-percussion marking machines (2),
   wherein the first information comprises individual marking instructions and configuration data for each of said micro-percussion marking machines (2), and
   wherein the second information comprises individual status reports from each of the micro-percussion marking machines (2).

19. The marking method according to claim 18, further comprising:
   retrieving the first information from a database prior to the wireless transmission thereof to the micro-percussion marking machines (2); and
   storing the second information in the database following wirelessly receiving the second information from the micro-percussion marking machines (2).

20. The marking method according to claim 18, further comprising wirelessly transmitting said first and/or second information to a remote element of the computer network (7).

21. The marking system (1) according to claim 6, wherein the centralized marking management device (9) is configured to:
   retrieve the first information from the at least one database (13) prior to the wireless transmission thereof to the micro-percussion marking machines (2); and
   store the second information in the at least one database (13) following wirelessly receiving the second information from the micro-percussion marking machines (2).

* * * * *

UNITED STATES PATENT AND TRADEMARK OFFICE
CERTIFICATE OF CORRECTION

PATENT NO. : 12,337,462 B2
APPLICATION NO. : 17/436039
DATED : June 24, 2025
INVENTOR(S) : Laurent Albert Paul Baud and Stéphane Noel Jacob Page 1 of 1

It is certified that error appears in the above-identified patent and that said Letters Patent is hereby corrected as shown below:

In the Claims

Claim 14, Column 11, Line 7, please delete the phrase "according to claim 12" and replace with "according to claim 13".

Signed and Sealed this
Twelfth Day of August, 2025

Coke Morgan Stewart
*Acting Director of the United States Patent and Trademark Office*